US009207910B2

(12) United States Patent
Azadet et al.

(10) Patent No.: US 9,207,910 B2
(45) Date of Patent: *Dec. 8, 2015

(54) DIGITAL SIGNAL PROCESSOR HAVING INSTRUCTION SET WITH AN $X^K$ FUNCTION USING REDUCED LOOK-UP TABLE

(75) Inventors: Kameran Azadet, Morganville, NJ (US); Jian-Guo Chen, Basking Ridge, NJ (US); Samer Hijazi, Bethlehem, NJ (US); Joseph Williams, Holmdel, NJ (US)

(73) Assignee: Intel Corporation, Santa Clara, CA (US)

( * ) Notice: Subject to any disclaimer, the term of this patent is extended or adjusted under 35 U.S.C. 154(b) by 1154 days.

This patent is subject to a terminal disclaimer.

(21) Appl. No.: 12/362,874

(22) Filed: Jan. 30, 2009

(65) Prior Publication Data

US 2010/0198893 A1 Aug. 5, 2010

(51) Int. Cl.
*G06F 1/035* (2006.01)
*G06F 7/556* (2006.01)

(52) U.S. Cl.
CPC ........... *G06F 7/556* (2013.01); *G06F 1/035* (2013.01); *G06F 2101/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,990,894 A * | 11/1999 | Hu et al. | | 345/418 |
| 6,529,922 B1 * | 3/2003 | Hoge | | 708/204 |
| 7,657,589 B2 * | 2/2010 | Verma | | 708/605 |
| 2003/0220953 A1 * | 11/2003 | Allred | | 708/277 |
| 2004/0010532 A1 * | 1/2004 | Lu | | 708/512 |
| 2004/0122878 A1 * | 6/2004 | George | | 708/290 |
| 2009/0037504 A1 * | 2/2009 | Hussain | | 708/277 |

* cited by examiner

*Primary Examiner* — Ilwoo Park
(74) *Attorney, Agent, or Firm* — Nicholson De Vos Webster & Elliot LLP

(57) ABSTRACT

A digital signal processor is provided having an instruction set with an $x^K$ function that uses a reduced look-up table. The disclosed digital signal processor evaluates an $x^K$ function for an input value, x, by computing Log(x) in hardware; multiplying the Log(x) value by K; and determining the $x^K$ function by applying an exponential function in hardware to a result of the multiplying step. One or more of the computation of Log(x) and the exponential function employ at least one look-up table having entries with a fewer number of bits than a number of bits in the input value, x.

29 Claims, 2 Drawing Sheets

DIGITAL SIGNAL PROCESSOR HAVING INSTRUCTION SET WITH AN $X^K$ FUNCTION USING REDUCED LOOK-UP TABLE

CROSS-REFERENCE TO RELATED APPLICATIONS

The present application is related to U.S. patent application Ser. No. 12/324,926, entitled "Digital Signal Processor Having Instruction Set with One or More Non-Linear Complex Functions;" U.S. patent application Ser. No. 12/324,927, entitled "Digital Signal Processor Having Instruction Set With One Or More Non-Linear Functions Using Reduced Look-Up Table;" U.S. patent application Ser. No. 12/324,931, entitled "Digital Signal Processor Having Instruction Set with One or More Non-Linear Functions Using Reduced Look-Up Table with Exponentially Varying Step-Size;" and U.S. patent application Ser. No. 12/324,934, entitled "Digital Signal Processor with One or More Non-Linear Functions Using Factorized Polynomial Interpolation;" each filed Nov. 28, 2008 and incorporated by reference herein.

FIELD OF THE INVENTION

The present invention is related to digital signal processing techniques and, more particularly, to techniques for digital processing of non-linear functions.

BACKGROUND OF THE INVENTION

Digital signal processors (DSPs) are special-purpose processors utilized for digital processing. Signals are often converted from analog form to digital form, manipulated digitally, and then converted back to analog form for further processing. Digital signal processing algorithms typically require a large number of mathematical operations to be performed quickly and efficiently on a set of data.

DSPs thus often incorporate specialized hardware to perform software operations that are often required for math-intensive processing applications, such as addition, multiplication, multiply-accumulate (MAC), and shift-accumulate. A Multiply-Accumulate architecture, for example, recognizes that many common data processing operations involve multiplying two numbers together, adding the resulting value to another value and then accumulating the result. Such basic operations can be efficiently carried out utilizing specialized high-speed multipliers and accumulators.

DSPs, however, generally do not provide specialized instructions to support non-linear mathematical functions, such as exp, log, cos, 1/x and $x^K$. Increasingly, however, there is a need for non-linear arithmetic operations in processors. A nonlinear function is any problem where the variable(s) to be solved for cannot be written as a linear sum of independent components. If supported at all, a DSP supports a non-linear function by using a large look-up table (LUT). An exemplary LUT may store on the order of 2,000 16 bit values, and thus require 32 kilobits of random access memory (RAM). The LUT is typically implemented in a separate dedicated SRAM (so that data and the non-linear LUT can be accessed at the same time to achieve improved performance).

In cases where the DSP is based on VLIW (Very Long Instruction Word) or SIMD (Single Instruction Multiple Data) architectures with N issues slots, the memory size becomes even larger. The LUT must be replicated N times because each issue slot must be able to read different values in the look-up table simultaneously, as the values of the data in each issue slot may be different. This replication of memory results in an even greater silicon area. For example, assuming a LUT in a 4-way vector co-processor, a memory size of 128 Kb is required (32 Kb×4). In addition, if different non-linear functions are required for different parts of a program being executed, the various LUTs must be loaded into memory, thereby significantly increasing latency and potentially reducing performance.

A need therefore exists for a digital signal processor having an instruction set that supports an $x^K$ function using a look-up table of reduced size.

SUMMARY OF THE INVENTION

Generally, a digital signal processor is provided having an instruction set with an $x^K$ function that uses a reduced look-up table. According to one aspect of the invention, the disclosed digital signal processor evaluates an $x^K$ function for an input value, x, by computing Log(x) in hardware; multiplying the Log(x) value by K; and determining the $x^K$ function by applying an exponential function in hardware to a result of the multiplying step. One or more of the computation of Log(x) and the exponential function employ at least one look-up table having entries with a fewer number of bits than a number of bits in the input value, x.

The Log(x) value can obtained by decomposing the input value, x, to a first part, N, a second part, q, and a remaining part, r, wherein the first part, N, is identified by a position of a most significant bit of the input value, x, and the second part, q, is comprised of a number of bits following the most significant bit, wherein the number is small relative to a number of bits in the input value, x. The logarithm function can be determined for the input value, x, by summing values of N, $$\text{Log}_2\left(1 + \frac{1}{2}q\right)$$

and $\text{Log}_2(1+\epsilon)$, where said epsilon term, $\epsilon$, is computed using the expression $$\frac{2^{-N}}{1 + \frac{1}{2}q}r,$$

where $$\left(1 + \frac{1}{2}q\right)^{-1}$$

is obtained from a look-up table.

The exponential function of the result can be obtained by decomposing the input value, x, to an integer part, N, a first fractional part, $q_1$, larger than a specified value, $x_0$, and a second fractional part, $q_2$, smaller than the specified value, $x_0$. The exponential function for the result is obtained by multiplying $2^{q_2}$, $2^{q_1}$ and $2^N$ together.

A more complete understanding of the present invention, as well as further features and advantages of the present invention, will be obtained by reference to the following detailed description and drawings.

DETAILED DESCRIPTION

The present invention provides a digital signal processor that supports an $x^K$ function using one or more look-up tables of reduced size. The present invention provides a digital signal processor that computes arbitrary powers of the input data, x, such as $x^2$, $x^3$, 1/x and sqrt(x), by companding the data (i.e., first taking log(x) using a linear operation (multiply by k)) and then taking an exponential of the result. Generally, one or more look-up tables store a subset of values for at least a portion of the computation of the logarithm or exponential functions. As used herein, the term "digital signal processor" shall be a processor that executes instructions in program code. Further, a hard-wired logic implementation of digital signal processing functions is not considered herein. It is noted that the disclosed $x^K$ function can be applied for values of x that are scalar or vector inputs.

In this manner, the present invention supports $x^K$ functions by using a smaller look-up table than required by conventional techniques. As previously indicated, an exemplary look-up table may store on the order of 2,000 16 bit values, and thus require 32 kilobits of random access memory (RAM). With the present invention, a smaller look-up table can be employed to store a subset of the 2,000 values.

Figure 1:
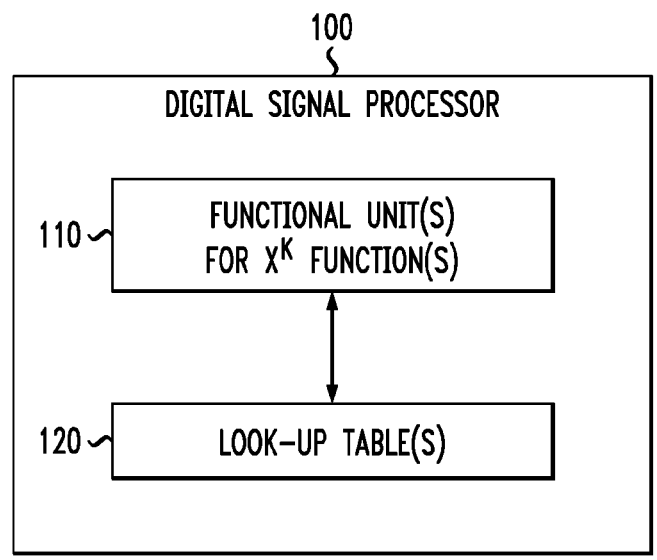
FIG. 1 is a schematic block diagram of an exemplary digital signal processor that incorporates features of the present invention.

FIG. 1 is a schematic block diagram of an exemplary digital signal processor 100 that incorporates features of the present invention. As shown in FIG. 1, the exemplary digital signal processor 100 includes one or more functional units 110 for $x^K$ functions. In addition, the digital signal processor 100 comprises one or more look-up tables 120 that store a subset of values for computing the $x^k$ function.

As discussed hereinafter, in various embodiments, the digital signal processor 100 may use hardware or a look-up table (or a combination thereof) to compute the $x^K$ function. Generally, if the digital signal processor 100 is processing software code that includes a predefined instruction keyword corresponding to an $x^K$ function and any appropriate operands for the function, the instruction decoder must trigger the appropriate $x^K$ functional units 110 that is required to process the instruction. It is noted that an $x^K$ functional unit 110 can be shared by more than one instruction.

Generally, the present invention extends conventional digital signal processors to provide an enhanced instruction set that supports $x^K$ functions using one or more look-up tables. The digital signal processor 100 in accordance with the present invention receives at least one number as an input, applies an $x^K$ function to the input and generates an output value.

The disclosed digital signal processors may have a scalar architecture, as shown in FIG. 1, that processes a single number at a time, or a vector architecture, as discussed hereinafter in conjunction with FIG. 3, that processes one or more numbers simultaneously. In the case of a vector-based digital signal processor implementation, the input number is a vector comprised of a plurality of scalar numbers that are processed in parallel.

The present invention recognizes that an $x^K$ function can be computed using the following expression:

$$x^K = e^{\log(x^K)} \quad (1)$$

since exponential and logarithm functions are inverse functions. Further, since $\log(x^K)$ equals $K \cdot \log(x)$, then $$x^K = e^{K \cdot \log(x)} \quad (2)$$

Figure 2:
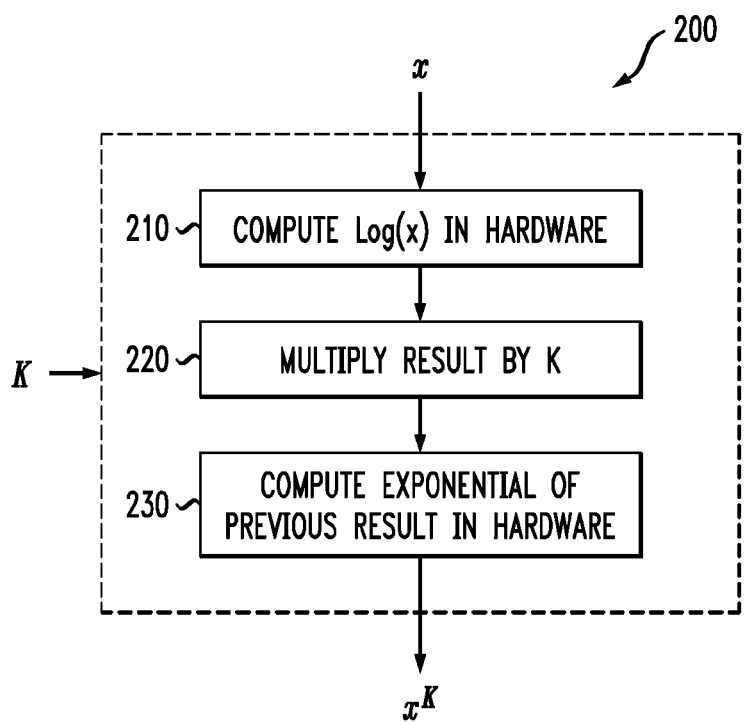
FIG. 2 is a flow chart describing an exemplary implementation of an $x^K$ function computation process that incorporates features of the present invention.

FIG. 2 is a flow chart describing an exemplary implementation of an $x^K$ function computation process 200 that incorporates features of the present invention. As shown in FIG. 2, the $x^K$ function computation process 200 initially computes Log(x) in hardware during step 210. Thereafter, the result of step 210 is multiplied by K during step 220. Thus, steps 210 and 220 compute the numerator of the right hand side of equation (2). Finally, an exponential function is applied to the result of step 220 in hardware during step 230 to obtain the desired $x^K$ value.

The logarithm function performed during step 210 can employ, for example, the techniques described in U.S. patent application Ser. No. 12/362,899, filed contemporaneously herewith, entitled "Digital Signal Processor Having Instruction Set With A Logarithm Function Using Reduced Look-Up Table," incorporated by reference herein. Generally, the logarithm of an input value, x, can be obtained by decomposing the input value, x, to a first part, N, a second part, q, and a remaining part, r, wherein the first part, N, is identified by a position of a most significant bit of the input value, x, and the second part, q, is comprised of a number of bits following the most significant bit, wherein the number is small relative to a number of bits in the input value, x. A value $$\text{Log}_2\left(1 + \frac{1}{2}q\right)$$

is obtained from a first look-up table based on the second part, q. An epsilon term, $\epsilon$, is computed using the expression $$\frac{2^{-N}}{1 + \frac{1}{2}q} r$$

and an expression $\text{Log}_2(1+\epsilon)$ is evaluated using a polynomial approximation. The desired logarithm function is then determined for the input value, x, by summing the values of N, $$\text{Log}_2\left(1 + \frac{1}{2}q\right)$$

and $\text{Log}_2(1+\epsilon)$. An initial basis of the logarithm function can optionally be translated from a binary representation to an arbitrary basis, Y, by multiplying a result of summing operation by $\text{Log}_Y(2)$, where $\log_Y(2)$, is obtained from a look-up table. In addition, the value $$\left(1 + \frac{1}{2}q\right)^{-1}$$

can be obtained from a look-up table. The epsilon term, $\epsilon$, can be computed by shifting r by N and multiplying by $$\left(1+\frac{1}{2}q\right)^{-1}.$$

The exponential function performed during step 230 can employ, for example, the techniques described in U.S. patent application Ser. No. 12/362,879, filed contemporaneously herewith, entitled "Digital Signal Processor Having Instruction Set With An Exponential Function Using Reduced Look-Up Table," incorporated by reference herein. Generally, an exponential function of an input value, x, can be obtained by decomposing the input value, x, to an integer part, N, a first fractional part, $q_1$, larger than a specified value, $x_0$, and a second fractional part, $q_2$, smaller than the specified value, $x_0$. A value $2^{q_2}$ is computed using a polynomial approximation. A value $2^{q_1}$ can be obtained from a look-up table. Finally, the exponential function for the input value, x, is obtained by multiplying $2^{q_2}$, $2^{q_1}$ and $2^N$ together.

An initial basis, Z, of the input value, x, can optionally be converted to a desired basis, Y, by multiplying the input value, x, by $\log_Z(Y)$, where $\log_Z(Y)$, is obtained from a second look-up table. The multiplication can be performed by first multiplying the values $2^{q_2}$ and $2^{q_1}$ together and the multiplication by $2^N$ is performed by shifting a result of the first multiplication by N bits. The $2^N$ value can be computed using a barrel shifter. The entries in the look-up table have a fewer number of bits than a number of bits in the input value, x.

Figure 3:
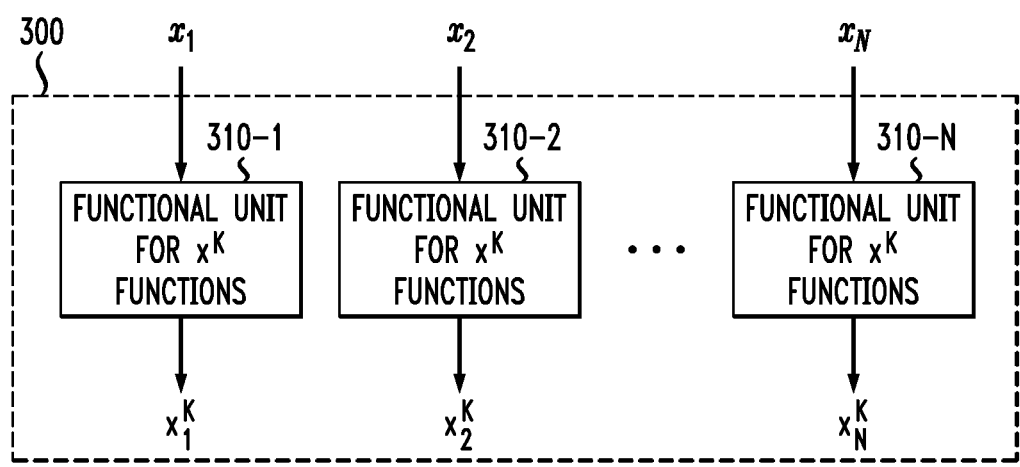
FIG. 3 is a schematic block diagram of an exemplary vector-based digital signal processor that processes one or more numbers simultaneously in accordance with an embodiment of the present invention.

FIG. 3 is a schematic block diagram of an exemplary vector-based digital signal processor 300 that processes one or more numbers simultaneously in accordance with an embodiment of the present invention. Generally, the vector-based implementation of FIG. 3 increases the number of MIPS (instructions per second), relative to the scalar implementation of FIG. 1, by performing different processes concurrently. Thus, the vector-based digital signal processor 300 contains plural functional units for $x^K$ functions 310-1 through 310-N. For example, a dual digital signal processor 300 contains two functional units 310-1 and 310-2 that are capable of performing two independent $x^K$ function operations concurrently.

As noted above, the input to the vector-based digital signal processor 300 is a vector, X, comprised of a plurality of scalar numbers, $x_n$, that are processed in parallel. For example, assume a vector-based digital signal processor 300 supports an $x^K$ function for a vector, X, where X is comprised of scalar numbers $x_1$ through $x_4$. The exemplary $x^K$ function may be expressed as follows:

Pow_vec4($x_1,x_2,x_3,x_4,K$).

CONCLUSION

While exemplary embodiments of the present invention have been described with respect to digital logic blocks and memory tables within a digital signal processor, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit or micro-controller. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, wherein, when the program code is loaded into and executed by a machine, such as a processor, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

It is to be understood that the embodiments and variations shown and described herein are merely illustrative of the principles of this invention and that various modifications may be implemented by those skilled in the art without departing from the scope and spirit of the invention.

We claim:

1. A method performed by a vector-based digital signal processor for evaluating a non-linear $x^K$ function for an input vector, x, said method comprising:

obtaining one or more $x^K$ software instructions that implement said non-linear $x^K$ function;

receiving said input vector comprising at least two scalar numbers and K;

in response to a predefined software instruction keyword for said at least one of said obtained $x^K$ software instructions, invoking at least one hardware functional unit that implements said one or more $x^K$ software instructions to perform the following steps for each component of said input vector, wherein said vector-based processor processes said at least two scalar numbers of said input vector substantially simultaneously;

computing Log(x) in hardware;

multiplying said Log(x) value by K; and determining said $x^K$ function by applying an exponential function in hardware to a result of said multiplying step, wherein one or more of said computation of Log(x) and said exponential function employ at least one look-up table having entries with a fewer number of bits than a number of bits in the input vector, x, wherein said one or more $x^K$ software instructions that implement said non-linear $x^K$ function is part of an instruction set of said vector-based digital signal processor and wherein said non-linear $x^K$ function computes a $K^{th}$ power of said input vector, x.

2. The method of claim 1, where said Log(x) value is obtained by the input vector, x, to a first part, N, a second part, q, and a remaining part, r, wherein said first part, N, is identified by a position of a most significant bit of said input vector, x, and said second part, q, is comprised of a number of bits following said most significant bit, wherein said number is less than five and small relative to a number of bits in said input vector, x.

3. The method of claim 2, further comprising the step of obtaining a value $$\text{Log}_2\left(1+\frac{1}{2}q\right)$$

from a first look-up table based on the second part, q.

4. The method of claim 2, further comprising the step of computing an epsilon term, $\epsilon$, using the expression $$\frac{2^{-N}}{1+\frac{1}{2}q}r,$$

where $$\left(1+\frac{1}{2}q\right)^{-1}$$

is obtained from a look-up table.

5. The method of claim 4, wherein said epsilon term, $\epsilon$, is computed by shifting r by N and multiplying by $$\left(1+\frac{1}{2}q\right)^{-1}.$$

6. The method of claim 4, further comprising the step of evaluating an expression $Log_2(1+\epsilon)$ using a polynomial approximation.

7. The method of claim 2, wherein said logarithm function is determined for the input vector, x, by summing values of N, $$Log_2\left(1+\frac{1}{2}q\right)$$

and $Log_2(1+\epsilon)$ to produce a corresponding component of an output vector.

8. The method of claim 7, further comprising the step of translating an initial basis for said log(x) function to an arbitrary basis, Y, by multiplying a result of said summing step by $Log_Y(2)$, where $log_Y(2)$, is obtained from a look-up table.

9. The method of claim 1, where said exponential function of said result is obtained by decomposing a component of the input vector, x, to an integer part, N, a first fractional part, $q_1$, larger than a specified value, $x_0$, and a second fractional part, $q_2$, smaller than the specified value, $x_0$.

10. The method of claim 9, wherein a value $2^{q_2}$ is computed using a polynomial approximation.

11. The method of claim 9, wherein a value $2^{q_1}$ is obtained from a look-up table.

12. The method of claim 9, wherein said exponential function for said result is obtained by multiplying $2^{q_2}$, $2^{q_1}$ and $2^N$ together.

13. The method of claim 12, wherein said multiplication comprises first multiplying the values $2^{q_2}$ and $2^{q_1}$ together and the multiplication by $2^N$ is performed by shifting a result of the first multiplication by N bits.

14. The method of claim 9, further comprising the step of converting an initial basis, Z, of the component of the input vector, x, to a desired basis, Y, by multiplying the component of the input vector, x, by $log_Z(Y)$, where $log_Z(Y)$, is obtained from a look-up table.

15. A vector-based digital signal processor for evaluating a non-linear $x^K$ function for an input vector, x, comprising:
   a first input for receiving one or more $x^K$ software instructions that implement said non-linear $x^K$ function;
   a data input for receiving said input vector comprising at least two scalar numbers and K;
   a set of hardware units responsive to the first input and the data input;
   a memory coupled to the hardware units and storing at least one look-up table wherein the vector-based digital signal processor is operative to perform the following steps for each component of said input vector, wherein said vector-based processor processes said at least two scalar numbers of said input vector substantially simultaneously:
   in response to a predefined software instruction keyword for said at least one of said received $x^K$ software instructions, invoke at least one hardware unit that implements said one or more $x^K$ software instructions operative to:
   compute Log(x) in hardware;
   multiply said Log(x) value by K; and
   determine said $x^K$ function by applying an exponential function in hardware to a result of said multiplying step, wherein one or more of said computation of Log(x) and said exponential function employ at least one look-up table having entries with a fewer number of bits than a number of bits in the input vector, x, wherein said one or more of said $x^K$ software instructions that implement said non-linear $x^K$ function is part of an instruction set of said digital signal processor and wherein said non-linear $x^K$ function computes a $K^{th}$ power of said input vector, x.

16. The vector-based digital signal processor of claim 15, where said Log(x) value is obtained by decomposing the input vector, x, to a first part, N, a second part, q, and a remaining part, r, wherein the first part, N, is identified by a position of a most significant bit of the input vector, x, and said second part, q, is comprised of a number of bits following said most significant bit, wherein said number is less than five and small relative to a number of bits in said input vector, x.

17. The vector-based digital signal processor of claim 16, further configured to obtain a value $$Log_2\left(1+\frac{1}{2}q\right)$$

from a first look-up table based on the second part, q.

18. The vector-based digital signal processor of claim 16, further configured to compute an epsilon term, $\epsilon$, using the expression $$\frac{2^{-N}}{1+\frac{1}{2}q}r,$$

where $$\left(1+\frac{1}{2}q\right)^{-1}$$

is obtained from a look-up table.

19. The vector-based digital signal processor of claim 18, wherein said epsilon term, $\epsilon$, is computed by shifting r by N and multiplying by $$\left(1+\frac{1}{2}q\right)^{-1}.$$

20. The vector-based digital signal processor of claim 18, further configured to compute an expression $Log_2(1+\epsilon)$ using a polynomial approximation.

21. The vector-based digital signal processor of claim 16, wherein said logarithm function is determined for the input vector, x, by summing values of N, $$Log_2\left(1 + \frac{1}{2}q\right)$$

and $Log_2(1+\epsilon)$ to produce a corresponding component of an output vector.

22. The vector-based digital signal processor of claim 21, further configured to translate an initial basis for said $log(x)$ function to an arbitrary basis, Y, by multiplying a result of said summing step by $Log_Y(2)$, where $Log_Y(2)$, is obtained from a look-up table.

23. The vector-based digital signal processor of claim 15, where said exponential function of said result is obtained by decomposing a component of the input vector, x, to an integer part, N, a first fractional part, $q_1$, larger than a specified value, $x_0$, and a second fractional part, $q_2$, smaller than the specified value, $x_0$.

24. The vector-based digital signal processor of claim 23, wherein a value $2^{q_2}$ is computed using a polynomial approximation.

25. The vector-based digital signal processor of claim 23, wherein a value $2^{q_1}$ is obtained from a look-up table.

26. The vector-based digital signal processor of claim 23, wherein said exponential function for said result is obtained by multiplying $2^{q_2}$, $2^{q_1}$ and $2^N$ together.

27. The vector-based digital signal processor of claim 26, wherein said multiplication comprises first multiplying the values $2^{q_2}$ and $2^{q_1}$ together and the multiplication by $2^N$ is performed by shifting a result of the first multiplication by N bits.

28. The vector-based digital signal processor of claim 23, further configured to convert an initial basis, Z, of the component of the input vector, x, to a desired basis, Y, by multiplying the component of the input vector, x, by $Log_Z(Y)$, where $Log_Z(Y)$, is obtained from a look-up table.

29. An integrated circuit, comprising:
a vector-based digital signal processor for evaluating a non-linear $x^K$ function for an input vector, x, comprising:
a first input for receiving one or more $x^K$ software instructions that implement said non-linear $x^K$ function;
a data input for receiving said input vector comprising at least two scalar numbers and K;
a memory storing at least one look-up table; and
at least one processor, coupled to the memory, operative to:
in response to a predefined software instruction keyword for said at least one of said received $x^K$ software instructions, invoke at least one hardware functional unit that implements said one or more non-linear $x^K$ software instructions operative to perform the following steps for each component of said input vector, wherein said vector-based processor processes said at least two scalar numbers of said input vector substantially simultaneously:
compute $Log(x)$ in hardware;
multiply said $Log(x)$ value by K; and
determine said $x^K$ function by applying an exponential function in hardware to a result of said multiplying step, wherein one or more of said computation of $Log(x)$ and said exponential function employ at least one look-up table having entries with a fewer number of bits in the input vector, x, wherein said one or more of said $x^K$ software instructions that implement said non-linear $x^K$ function is part of an instruction set of said vector-based digital signal processor and wherein said non-linear $x^K$ function computes a $K^{th}$ power of said input vector, x.

* * * * *